United States Patent
Okada

[19]

[11] Patent Number: 5,907,212
[45] Date of Patent: May 25, 1999

[54] APPARATUS PROVIDED WITH ELECTRO-MECHANICAL TRANSDUCER

[75] Inventor: Hiroyuki Okada, Izumi, Japan

[73] Assignee: Minolta Co., Ltd., Osaka, Japan

[21] Appl. No.: 08/812,815

[22] Filed: Mar. 6, 1997

[30] Foreign Application Priority Data

Mar. 6, 1996 [JP] Japan ................................ 8-075444

[51] Int. Cl.⁶ .................................................. H01L 41/08
[52] U.S. Cl. ........................ 310/328; 310/323; 310/316; 310/317
[58] Field of Search .................... 310/323, 328, 310/316, 317

[56] References Cited

U.S. PATENT DOCUMENTS

| | | | |
|---|---|---|---|
| 3,902,084 | 8/1975 | May, Jr. ................................... | 310/310 |
| 4,874,979 | 10/1989 | Rapp ....................................... | 310/328 |
| 5,027,027 | 6/1991 | Orbach et al. ........................... | 310/317 |
| 5,587,846 | 12/1996 | Miyano et al. .......................... | 359/824 |

FOREIGN PATENT DOCUMENTS 4-69070   3/1992   Japan .
7-298656  11/1995  Japan .

Primary Examiner—Mark O. Budd
Attorney, Agent, or Firm—McDermott, Will & Emery

[57] ABSTRACT

A control section 31 comprised of a CPU is connected to a position detection circuit 33 for detecting the position of a driving axis 13 by means of an MR sensor 34, a first-current charging and discharging circuit 35 for driving a piezoelectric element 14, a first-current charging and discharging circuit 36, a second-current charging and discharging circuit 37 and a third-current charging and discharging circuit 38, the last three having different values of currents for driving a piezoelectric element 16. High-speed driving and low-speed driving are alternatively used depending on a detected position. In the case of the high-speed driving, the driving axis 13 is driven at high speed by continuously generating extension/contraction displacement of a varied speed in the piezoelectric element 16 by means of the first-current charging and discharging circuit 36. In the case of the low-speed driving, the driving of the piezoelectric element 16 by means of the charging and discharging circuits 36 through 38 is combined with the operation of holding the axis 13 executed by driving the piezoelectric element 14 by means of the charging and discharging circuit 35, thereby driving the axis 13 at low speed in units of one cycle of the extension/contraction displacement of the piezoelectric element 16.

15 Claims, 9 Drawing Sheets

APPARATUS PROVIDED WITH ELECTRO-MECHANICAL TRANSDUCER

BACKGROUND OF THE INVENTION

1. Field of the Invention

The present invention relates to an apparatus employing a driving mechanism provided with an electro-mechanical transducer such as an electrostrictive element, a piezoelectric element and a magnetostrictor for transducing an electric energy into mechanical displacement.

2. Description of the Prior Art

As a drive mechanism for moving a lens of a camera or the like into an in-focus position, there has been proposed a drive mechanism in which a driven member is put in frictional coupling with a driving axis fixed to a piezoelectric element with an appropriate frictional force, and the driving axis is reciprocally displaced by generating extension/contraction displacement at a varied speed in the piezoelectric element so as to move the driven member put in frictional coupling with the driving axis in a specified direction (refer to Japanese Laid-Open Patent Application No. Hei 4-69070). This drive mechanism has not only the feature of a remarkably compact size, light weight and low manufacturing cost as compared with those of the conventionally used drive mechanism comprised of a motor and a speed reduction mechanism but also the feature that it can execute a high-accuracy position control.

Furthermore, the specification of the U.S. Pat. No. 4,874,979 proposes one in which its driven member is moved by combining three piezoelectric elements with one another and appropriately controlling the timing at which extension/contraction displacement occurs in each of the piezoelectric elements.

In regard to the aforementioned structures of the drive apparatuses, the former is constructed so that the driving axis and the driven member are put in frictional coupling with each other, and when the driving axis is driven by the piezoelectric element, slip is generated between the frictional coupling surfaces of both of them and the slip is utilized for moving the driven member in a specified direction. However, since the amount of slip is not always constant, the position of the driven member cannot be controlled through an open loop, and it is required to execute feedback control with a means for detecting the position of the driven member. In this case, the position control cannot be executed finer than the resolution of the position detecting means. Therefore, in order to execute high-accuracy position control, a position detecting means having a high resolution appropriate for the required accuracy is necessary, and this results in increasing cost.

Furthermore, in the latter, the position of the driven member can be controlled through an open loop when the extension/contraction displacement amount of each piezoelectric element relative to an applied voltage is previously known. However, in addition to the disadvantage that the driving speed is slow, the number of components increases due to the use of three piezoelectric elements, and this results in increasing manufacturing cost.

SUMMARY OF THE INVENTION

It is an object of the present invention to solve the problems of the aforementioned conventionally proposed drive mechanisms employing a piezoelectric element and to provide an apparatus employing a drive mechanism provided with an electro-mechanical transducer capable of executing high-speed driving as well as high-accuracy position control.

In order to attain the objects described above, one aspect of the present invention comprises:

a base member;

a moving member which is movable relative to said base member;

a holder which holds said moving member by frictional coupling with a first frictional force;

a first electro-mechanical transducer which is provided between said base member and said holder and operates to extend and contract a gap between said base member and said holder in a direction in which said moving member moves;

a second electro-mechanical transducer which is displaced so that it takes a first state in which said moving member is substantially fixed with respect to said base member and a second state in which said moving member is substantially released with respect to said base member; and a controller which selectively effects one of:

a first control mode in which said second electro-mechanical transducer is maintained in said second state, said holder is made to reciprocate at a varied speed depending on when it goes or returns by generating extension/contraction in the first electro-mechanical transducer at a varied speed depending on when the transducer is extended or contracted, thereby driving said moving member put in frictional coupling with said holder in a specified direction with respect to said base member; and a second control mode in which an operation of reciprocally displacing said holder with respect to said base member by generating extension/contraction displacement in said first electro-mechanical transducer is combined with an operation of switching the state of said second electro-mechanical transducer between said first state and said second state, thereby driving said moving member put in frictional coupling with said holder in a specified direction with respect to said base member.

Otherwise, another aspect of the present invention comprises:

a base member;

a moving member which is movable relative to said base member;

a holder which holds said moving member by frictional coupling with a first frictional force;

a first electro-mechanical transducer which is provided between said base member and said holder and operates to extend and contract a gap between said base member and said holder at a varied speed depending on when it is extended or contracted in a direction in which said moving member moves, thereby driving said moving member put in frictional coupling with said holder in a specified direction with respect to said base member; and a second electro-mechanical transducer which is displaced so that it takes a first state in which said moving member is substantially fixed with respect to said base member and a second state in which said moving member is substantially released with respect to said base member.

With the above arrangement, it is allowed to execute the driving by the combination of the first control mode with the second control mode at need, and therefore, high-speed and high-accuracy position control can be achieved.

Furthermore, it is allowed to provide two electromechanical transducers, and accordingly, this permits a reduced number of components, not resulting in cost increase.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
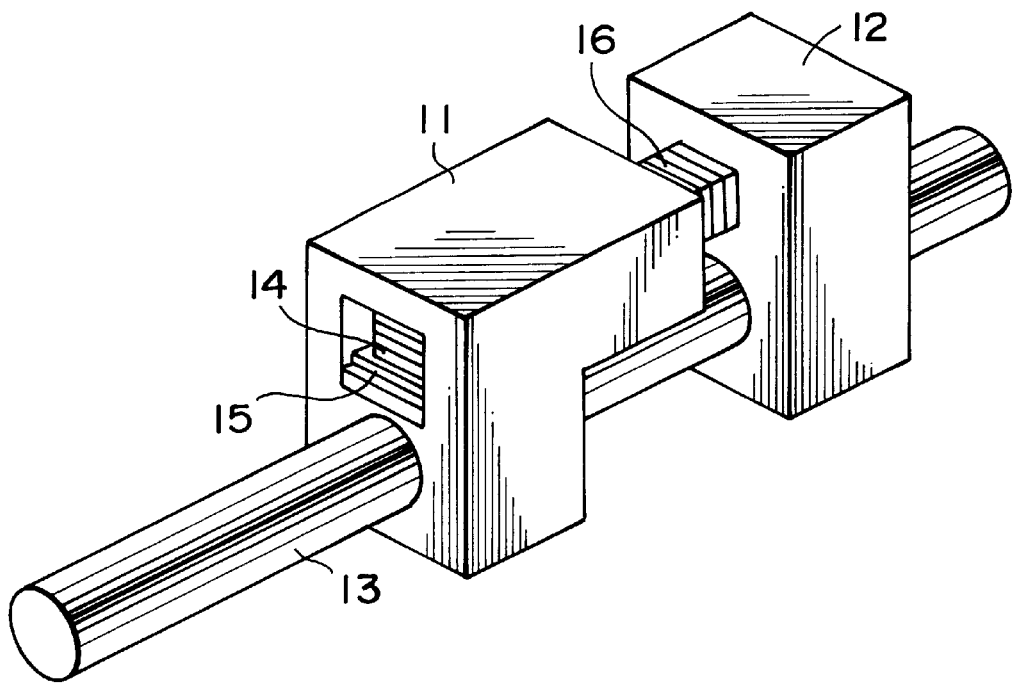
FIG. 1 is a perspective view showing the basic structure of an embodiment of the present invention.

An embodiment of the present invention is approximately as follows.

A control section 31 comprised of a CPU is connected to a first-current charging and discharging circuit 35 for driving a piezoelectric element 14, a first-current charging and discharging circuit 36, a second-current charging and discharging circuit 37 and a third-current charging and discharging circuit 38, the last three having different current values for driving a piezoelectric element 16. High-speed driving and low-speed driving are alternatively used depending on a detected position. In the case of the high-speed driving, the axis 13 is driven at high speed by continuously generating extension/contraction displacement of a varied speed in the piezoelectric element 16 by the charging and discharging circuit 36. In the case of the low-speed driving, the driving of the piezoelectric element 16 by the charging and discharging circuits 36 through 38 is combined with the operation of holding the axis 13 executed by driving the piezoelectric element 14 by the charging and discharging circuit 35, thereby driving the axis 13 at low speed in units of one cycle of the extension/contraction displacement of the piezoelectric element 16 (see FIG. 5).

Figure 2:
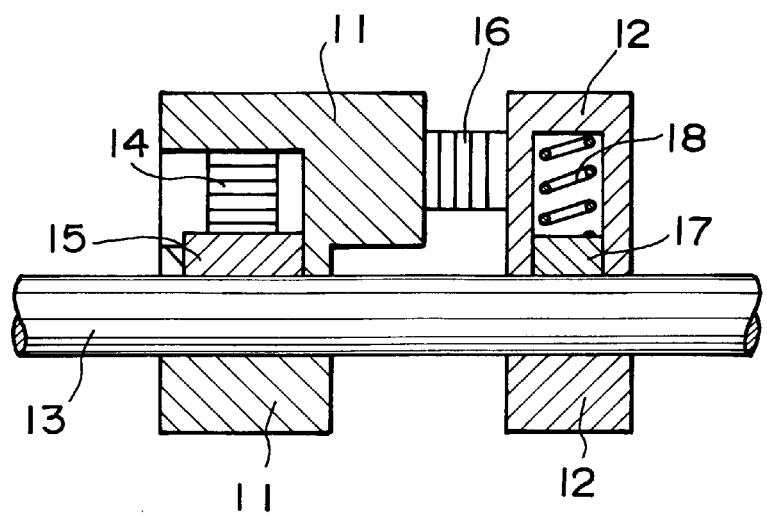
FIG. 2 is a sectional view of the basic structure of the embodiment shown in FIG. 1.

The embodiment of the present invention will be described in detail below. In FIGS. 1 and 2, the reference numbers 11, 12 and 13 denote a base member, a holder and a driving axis, respectively. Further, the reference number 14 denotes a second piezoelectric element 14 which is displaced as extended or contracted in the direction of thickness while being arranged between the base member 11 and a pad 15. The upper and lower end surfaces of the piezoelectric element 14 are fixed as stuck to the base member 11 and the pad 15, respectively.

The pad 15 is a member arranged between the base member 11 and the driving axis 13, and its lower surface is formed into an arc-shaped curved surface to be put in surface contact with the surface of the driving axis 13. When extension displacement is generated in the direction of thickness in the piezoelectric element 14 and the pad 15 is pressed against the driving axis 13, the pad 15, or the base member 11 and the driving axis 13 are put in frictional coupling with each other with a specified frictional force.

On the other hand, inside the holder 12 is provided a pressure plate 17 that is urged toward the driving axis 13 by a spring 18, where the holder 12 and the driving axis 13 are put in frictional coupling with each other via the pressure plate 17 that is pressed by the urging force of the spring 18. The frictional coupling force is set so that it is weaker than the frictional coupling force between the pad 15, or the base member 11 and the driving axis 13 when the pad 15 is pressed against the driving axis 13 as a consequence of the generation of extension displacement in the second piezoelectric element 14.

Between the base member 11 and the holder 12 is provided a first piezoelectric element 16 that is displaced as extended or contracted in the direction of thickness in parallel with the driving axis 13, and the left and right end surfaces of the piezoelectric element 16 are fixed as stuck to the base member 11 and the holder 12, respectively.

Next, the principle of operation of this structure will be described with reference to FIGS. 3 and 4.

First, the principle of operation in the case of the high-speed driving will be described with reference to (a) through (c) of FIG. 3. It is assumed that the base member 11 is fixed to a frame (not shown).

Figure 3:
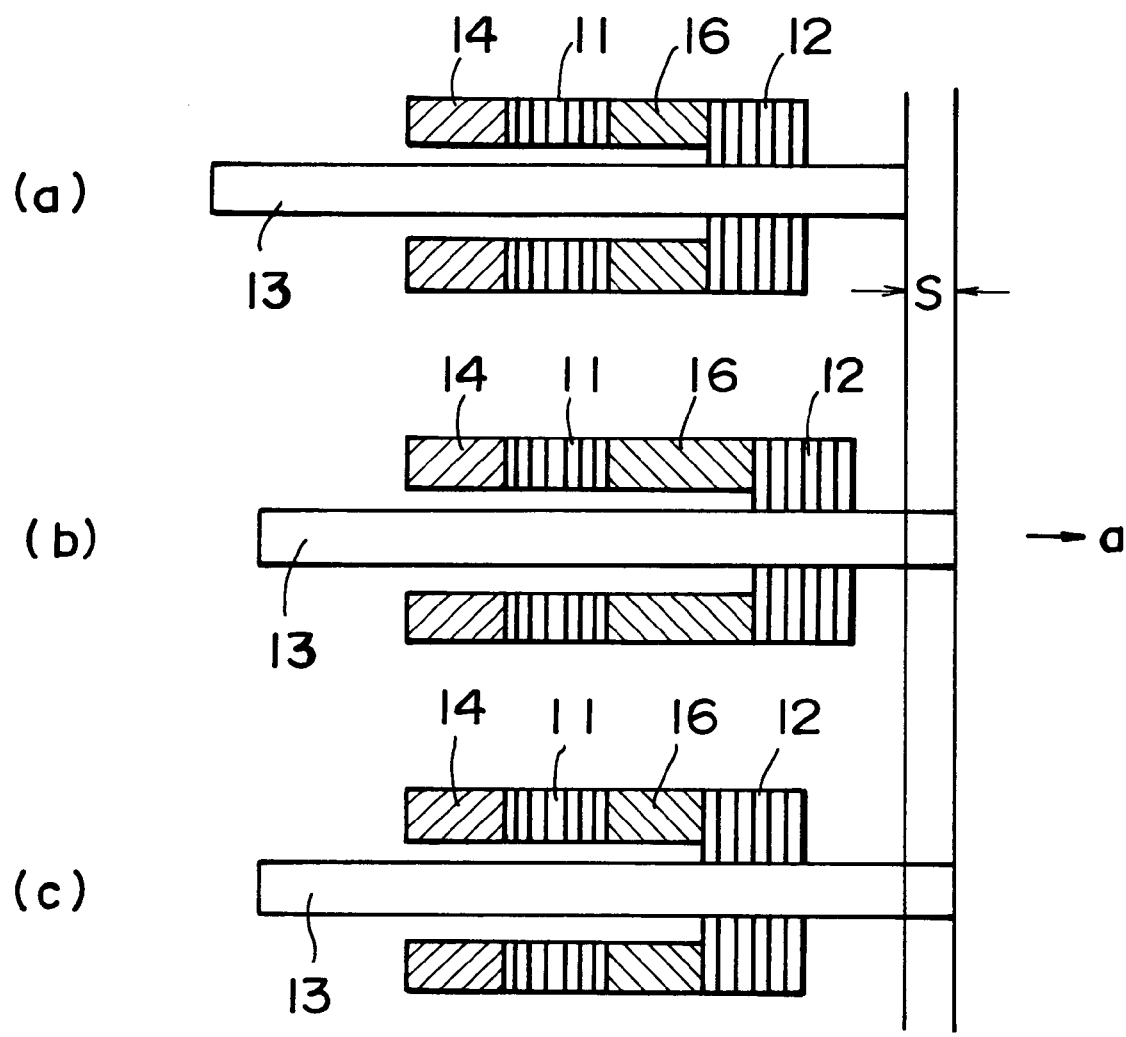
FIG. 3 shows diagrams for explaining the principle of operation in the case of high-speed driving of the above embodiment.

(a) of FIG. 3 shows the initial state. When slow extension displacement is generated in the first piezoelectric element 16 in this state, a state as shown in (b) is achieved, where the holder 12 is slowly displaced in the direction of the arrow "a" with respect to the base member 11. In this stage, since the holder 12 and the driving axis 13 are put in frictional coupling with each other by the pressure plate 17 that is pressed by the urging force of the spring 18, the driving axis 13 is slowly displaced in the direction of the arrow "a" together with the holder 12.

When abrupt contraction displacement is generated in the first piezoelectric element 16 in the state shown in (b) of FIG. 3, a state shown in (c) is achieved, where the holder 12 is abruptly displaced in the direction opposite to the direction of the arrow "a" with respect to the base member 11. In this stage, the driving axis 13 that is put in frictional coupling with the holder 12 substantially stays in the position as a consequence of conquest of its inertial force against the frictional coupling force, meaning that it does not move. As a result, the driving axis 13 returns to its initial state in the state in which it is moved in the direction of the arrow "a" by a distance "s" approximately corresponding to the extension displacement of the first piezoelectric element 16, e.g., by a distance of 1.5 $\mu$m.

Thus, by continuously generating alternately the slow extension displacement and the abrupt contraction displacement in the first piezoelectric element 16, the driving axis 13 can be moved in the direction of the arrow "a". It is to be noted that the term of "substantially" means inclusion of the total movement of the axis in the direction of the arrow "a" as a consequence of its follow with a slip generated on the frictional coupling surface between the holder 12 and the driving axis 13 in either the direction of the arrow "a" or in the direction opposite to it. Therefore, the movement distance "s" in one cycle of the extension/contraction displacement of the piezoelectric element 16 is not exactly the amount of extension displacement of the piezoelectric element, e.g., 1.5 μm but smaller than it, depending on the degree of slip on the frictional coupling surface, meaning that the movement distance varies depending on the magnitude of the frictional coupling force and the driving speed. As a result of an experiment, a maximum speed of 40 mm/sec can be attained.

Next, the principle of operation of the low-speed driving will be described with reference to (a) through (e) of FIG. 4. It is assumed that the base member 11 is affixed to a frame (not shown).

Figure 4:
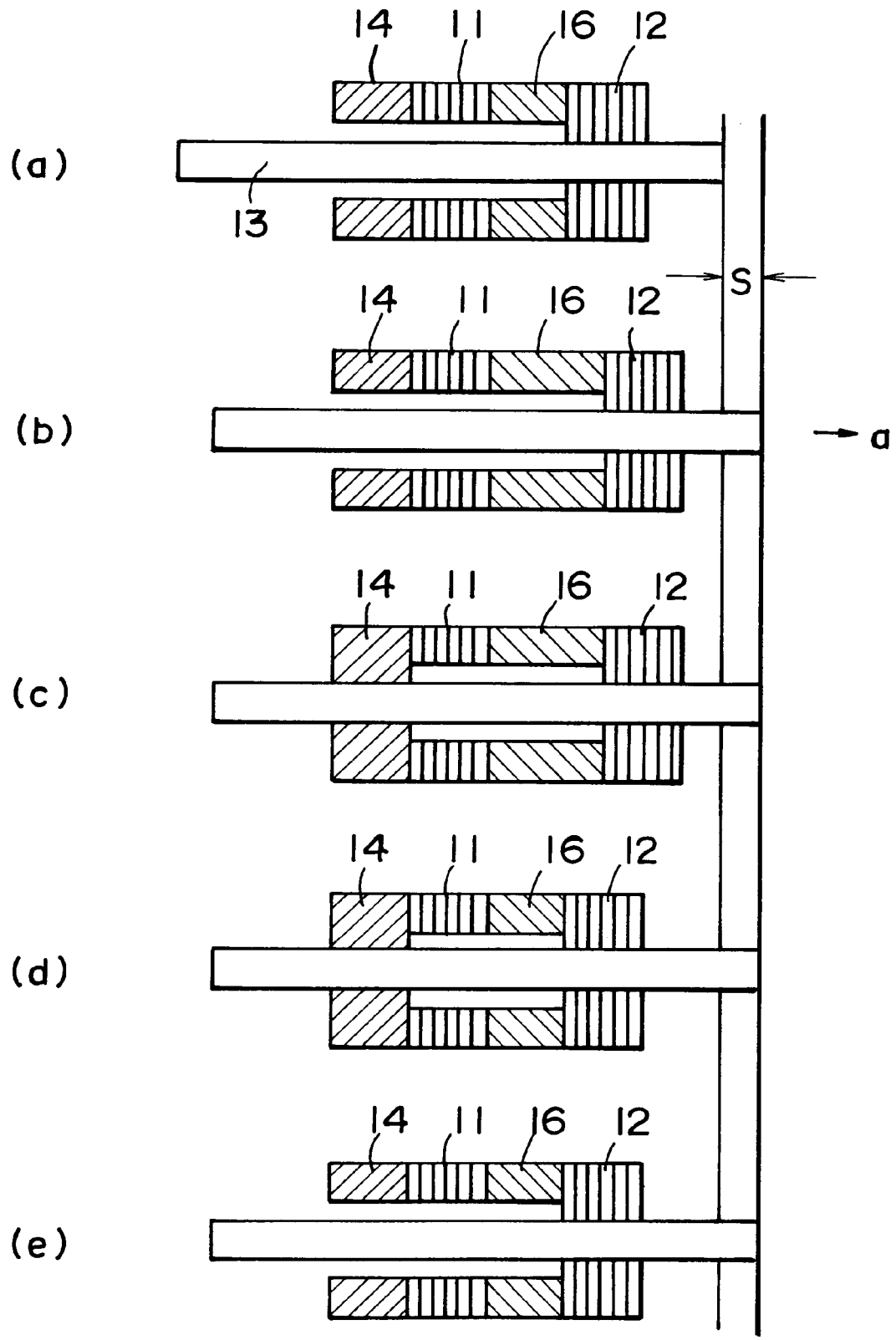
FIG. 4 shows diagrams for explaining the principle of operation in the case of low-speed driving of the above embodiment.

(a) of FIG. 4 shows the initial state. When slow extension displacement is generated in the first piezoelectric element 16 in this state, a state as shown in (b) is achieved, where the holder 12 is slowly displaced in the direction of the arrow "a" with respect to the base member 11. In this stage, since the holder 12 and the driving axis 13 are put in frictional coupling with each other by the pressure plate 17 that is pressed by the urging force of the spring 18, the driving axis 13 is slowly displaced in the direction of the arrow "a" together with the holder 12.

Next, in the state shown in (b) of FIG. 4, a voltage is applied to the second piezoelectric element 14 to generate displacement, so that the pad 15 is pressed against the driving axis 13 to fix the driving axis 13 to the base member 11 by frictional coupling. (c) of FIG. 4 shows this state.

When the voltage applied to the first piezoelectric element 16 is removed in the state shown in (c) of FIG. 4, the first piezoelectric element 16 contracts, and the holder 12 is displaced in the direction opposite to the direction of the arrow "a". In this stage, the frictional coupling force between the holder 12 and the driving axis 13 is weaker than the frictional coupling force between the base member 11 and the driving axis 13 by the displacement of the second piezoelectric element 14. Therefore, slip is generated between the holder 12 and the driving axis 13, meaning that the driving axis 13 does not move. (d) of FIG. 4 shows this state.

When the voltage applied to the second piezoelectric element 14 is removed in the state shown in (d) of FIG. 4, a state as shown in (e) of FIG. 4 is achieved, where the driving axis 13 returns to its initial state in the state in which it is moved in the direction of the arrow "a" by the distance "s" corresponding to the extension displacement of the first piezoelectric element 16.

By continuously repeating the above operation, the driving axis 13 can be moved in the direction of the arrow "a". In the case of the aforementioned low-speed driving, the movement amount "s" of the driving axis 13 is determined depending on the displacement amount of the first piezoelectric element 16. Assuming now that the extension displacement amount of the piezoelectric element is 1.5 μm, the axis can be moved by 1.5 μm in one cycle, it is therefore required to continuously repeat the above operation by 100 times in order to move it by 150 μm.

Figure 5:
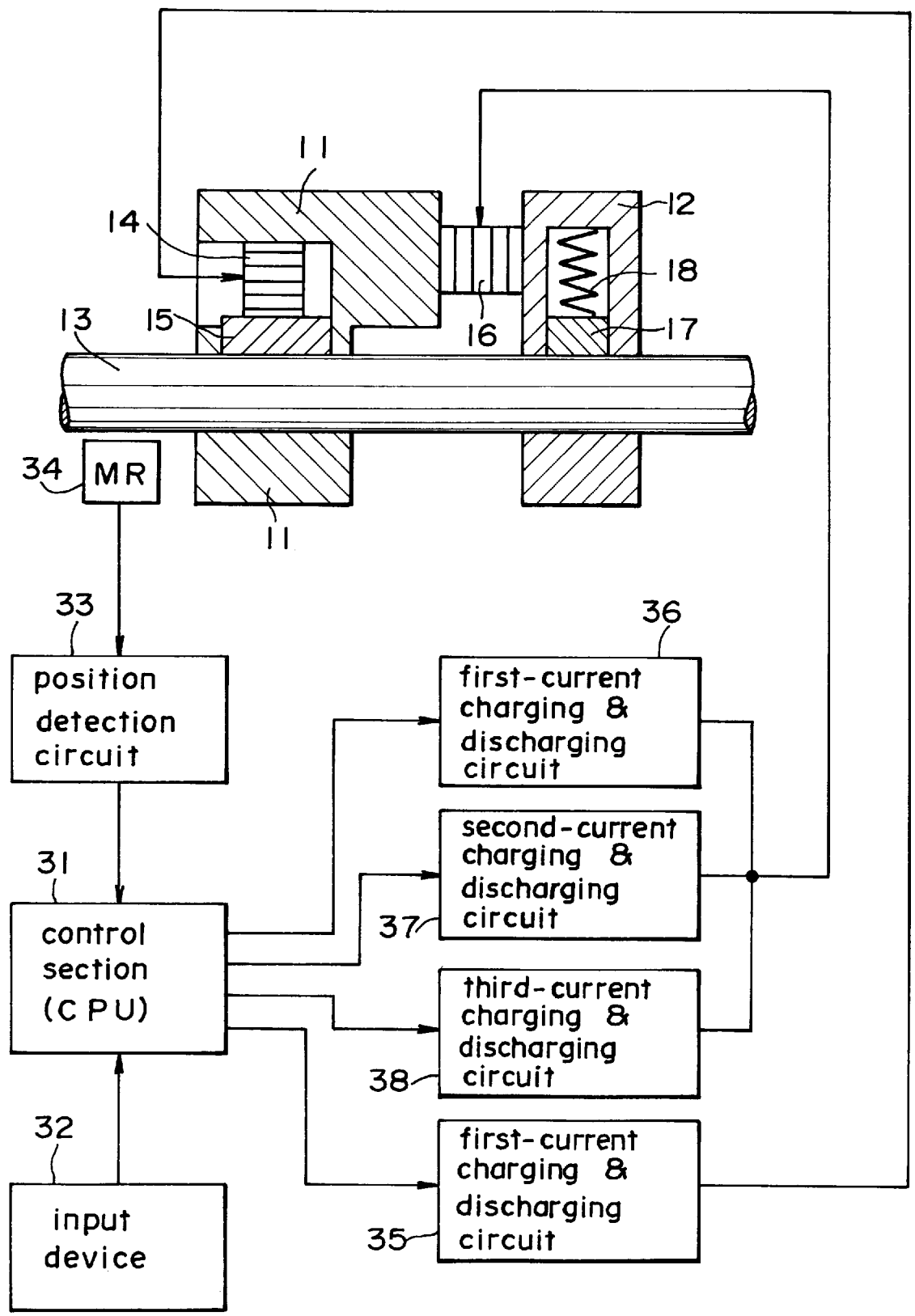
FIG. 5 is a block diagram of a drive circuit of the above embodiment.

FIG. 5 is a block diagram of a drive circuit of the drive apparatus shown in FIG. 1. The control section 31 is comprised of a CPU, and its input port is connected to an input device 32 such as a keyboard and a position detection circuit 33 for detecting the current position of the driving axis 13. The input device 32 is used for inputting a target position of an object to be moved by the drive apparatus.

The reference number 34 denotes a magnetic resistor element of a known MR sensor, which can detect the current position of the driving axis 13 by forming a magnetized rod by preparatorily magnetizing the driving axis 13 with magnetic poles N and S at specified intervals and detecting this by means of the magnetic resistor element 34. The magnetized rod (driving axis 13) magnetized with the magnetic poles N and S at specified intervals and the magnetic resistor element constitute the MR sensor. It is to be noted that the resolution of the MR sensor is determined by a magnetic pole pitch (interval between adjacent magnetic poles) of the magnetized rod. The position detection circuit 33 amplifies a signal output from the magnetic resistor element 34 and converts it into a digital signal to output the same to the control section 31.

Output ports of the control section 31 are connected to a first-current charging and discharging circuit 35 for driving the piezoelectric element 14 and three charging and discharging circuits of a first-current charging and discharging circuit 36, a second-current charging and discharging circuit 37 and a third-current charging and discharging circuit 38, each having different current values for driving the piezoelectric element 16 at different speeds.

Figure 6:
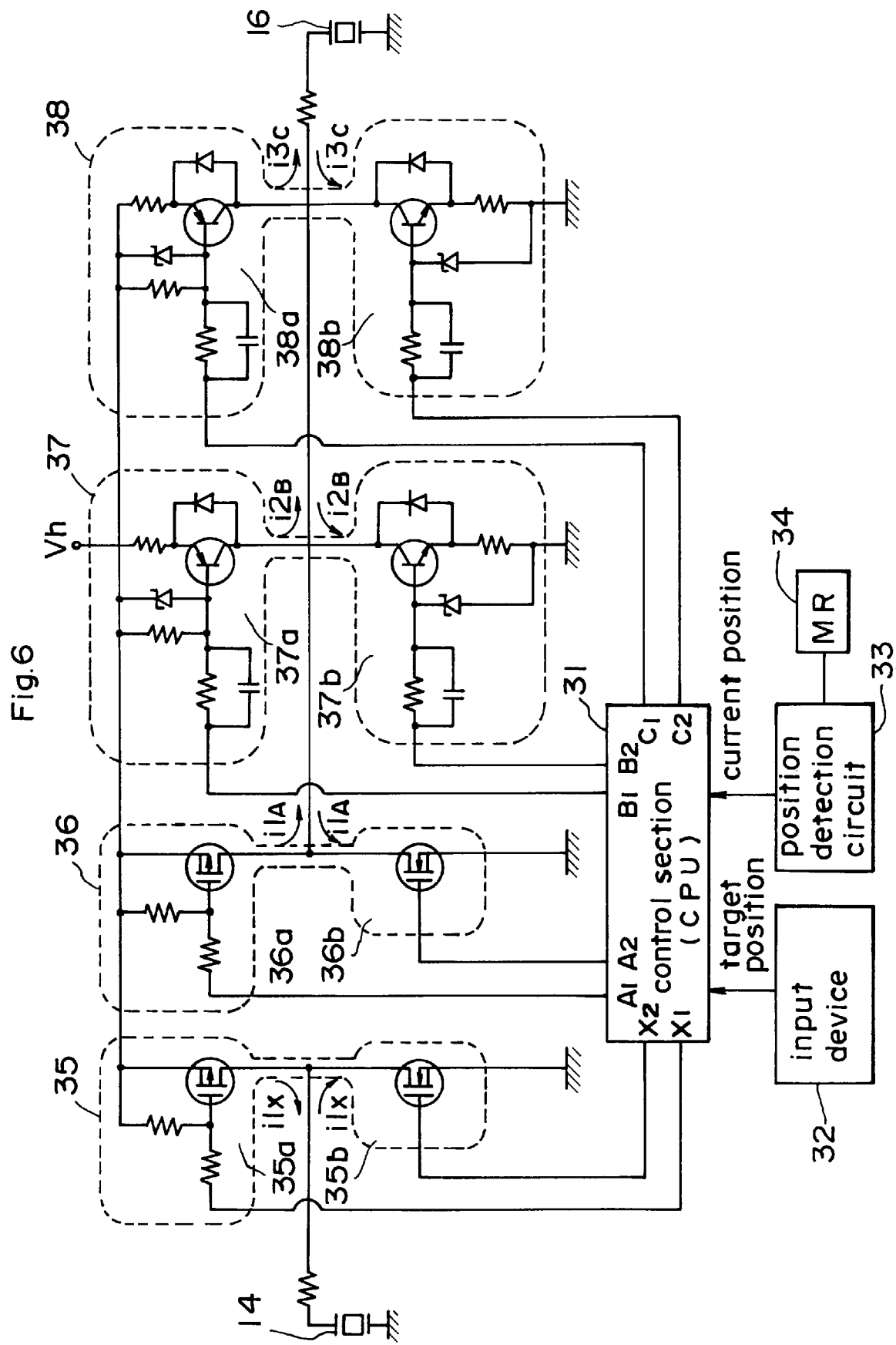
FIG. 6 is a circuit diagram for explaining in detail a current charging and discharging circuit of the drive circuit shown in FIG. 5.

FIG. 6 shows a circuit diagram of the first-current charging and discharging circuit 35, the first-current charging and discharging circuit 36, the second-current charging and discharging circuit 37 and the third-current charging and discharging circuit 38. These charging and discharging circuits are controlled by the control section 31, while the control section 31 is connected to the input device 32 for inputting the target position of the moving object and the position detection circuit 33 including the MR sensor for detecting the current position of the moving object.

The first-current charging and discharging circuit 35 is the circuit for rapidly charging and discharging the piezoelectric element 14 to drive it at high speed. This circuit is comprised of a circuit 35a for charging the piezoelectric element with a current i1x and a circuit 35b for discharging the piezoelectric element with the current i1x. The circuit 35a is connected to an output port X1 of the control section 31 and includes an FET connected to a power source Vh, while the circuit 35b is connected to an output port X2 of the control section 31 and includes a grounded FET, their operations being controlled by the control section 31.

The first-current charging and discharging circuit 36 is the circuit which has the same characteristic as that of the charging and discharging circuit 35 and rapidly charges and discharges the piezoelectric element 16 to drive the same at high speed. The first-current charging and discharging circuit 36 is comprised of a circuit 36a for charging the piezoelectric element 16 with a current i1A and a circuit 36b for discharging the piezoelectric element 16 with the current i1A. The circuit 36a is connected to an output port A1 of the control section 31 and includes an FET connected to the power source Vh, while the circuit 36b is connected to an output port A2 of the control section 31 and includes a grounded FET, their operations being controlled by the control section 31.

The second-current charging and discharging circuit 37 is the circuit for charging and discharging the piezoelectric element 16 with a current smaller than that of the first-current charging and discharging circuit 36. The second-current charging and discharging circuit 37 is comprised of a circuit 37a for charging the piezoelectric element 16 with a constant current i2B and a circuit 37b for discharging the piezoelectric element 16 with the constant current i2B. The circuit 37a is connected to an output port B1 of the control section 31 and includes a transistor connected to the power source Vh, while the circuit 37b is connected to an output port B2 of the control section 31 and includes a grounded transistor, their operations being controlled by the control section 31.

The third-current charging and discharging circuit 38 is the circuit for charging and discharging the piezoelectric element 16 with a current smaller than that of the second-current charging and discharging circuit 37. The third-current charging and discharging circuit 38 is comprised of a circuit 38a for charging the piezoelectric element 16 with a constant current i3C and a circuit 38b for discharging the piezoelectric element 14 with the constant current i3C. The circuit 38a is connected to an output port C1 of the control section 31 and includes a transistor connected to the power source Vh, while the circuit 38b is connected to an output port C2 of the control section 31 and includes a grounded transistor, their operations being controlled by the control section 31.

Figure 7:
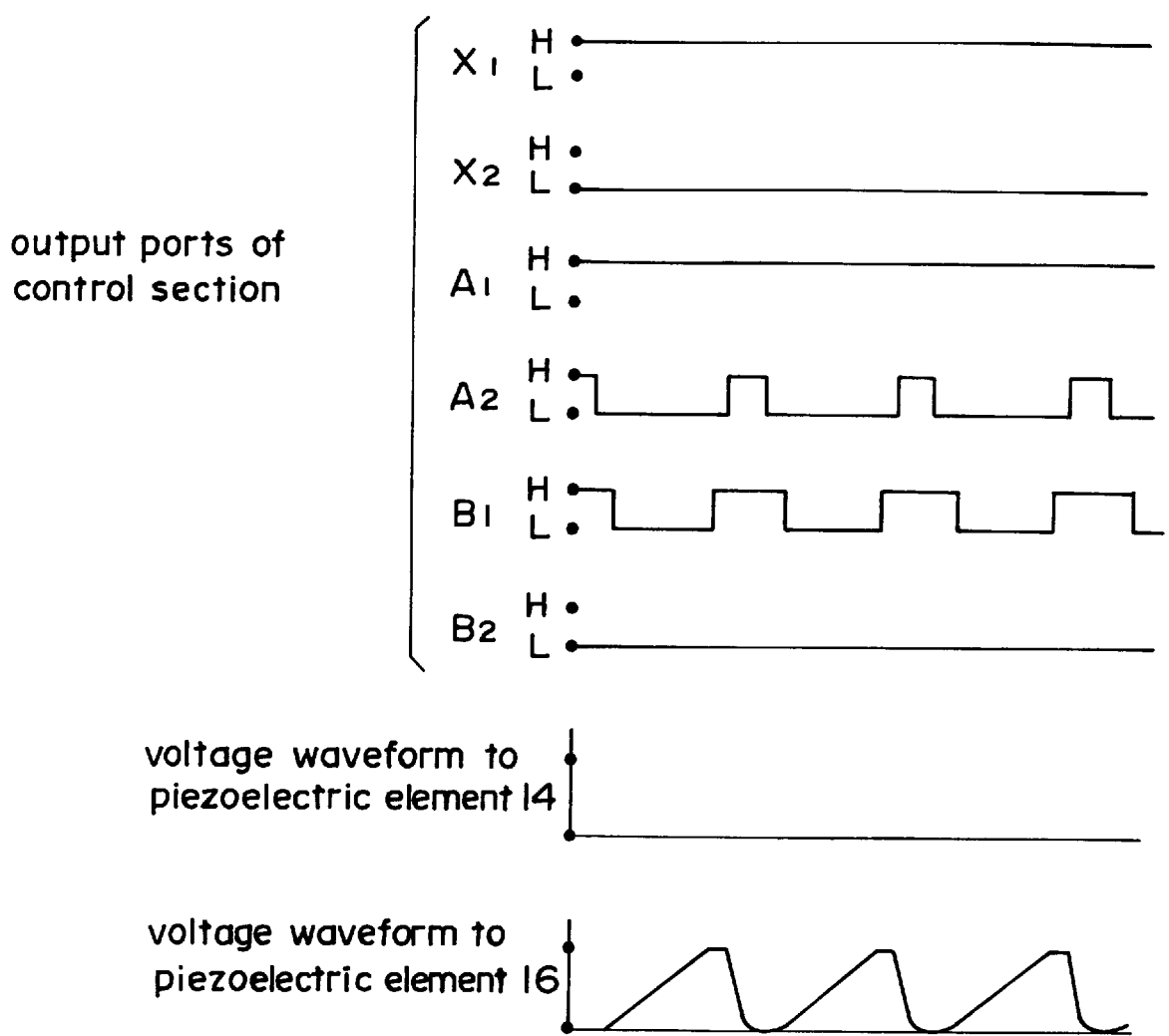
FIG. 7 is a chart for explaining output signals of a control section and the voltage waveforms applied to piezoelectric elements in the case of high-speed driving.

FIG. 7 is a chart for explaining signals output from the output ports of the control section 31 when driving the drive apparatus of the present invention at high speed (in the direction of the arrow "a") and voltage waveforms applied to the piezoelectric elements. In the figure is shown an example for rapidly charging and discharging the piezoelectric element 16 by the first-current charging and discharging circuit 36 and the second-current charging and discharging circuit 37 to drive it at high speed.

That is, the output port X1 of the control section 31 is maintained at H (high level), X2 is maintained at L (low level), the piezoelectric element 14 is maintained in its unoperated state, the output port A1 is maintained at H, B2 is maintained at L and the circuit 36a and the circuit 37b are cut off. In this state (see (a) of FIG. 3), firstly the output port B1 is set to L. The transistor of the circuit 37a becomes conductive to slowly charge the piezoelectric element 16, and the charging stops when a saturated state is provided. The piezoelectric element 16 is in its extended state (see (b) of FIG. 3).

After a lapse of a specified time, the output port B1 is toggled to H to cut off the circuit 37a, and the output port A2 is toggled to H to make the FET of the circuit 36b conductive. When the charges that have been charged in the piezoelectric element 16 are abruptly discharged, the piezoelectric element 16 contracts to enter into the state shown in (c) of FIG. 3. In this stage, the first-current charging and discharging circuit 35 does not operate, and the piezoelectric element 14 is not driven.

When driving the drive apparatus in the direction opposite to the direction of the arrow "a," it is required to rapidly charge the piezoelectric element 16 and slowly discharge the same. That is, it is required to rapidly charge it by the circuit 36a, slowly discharge it by the circuit 37b and cut off the circuit 36b and the circuit 37a.

Figure 8:
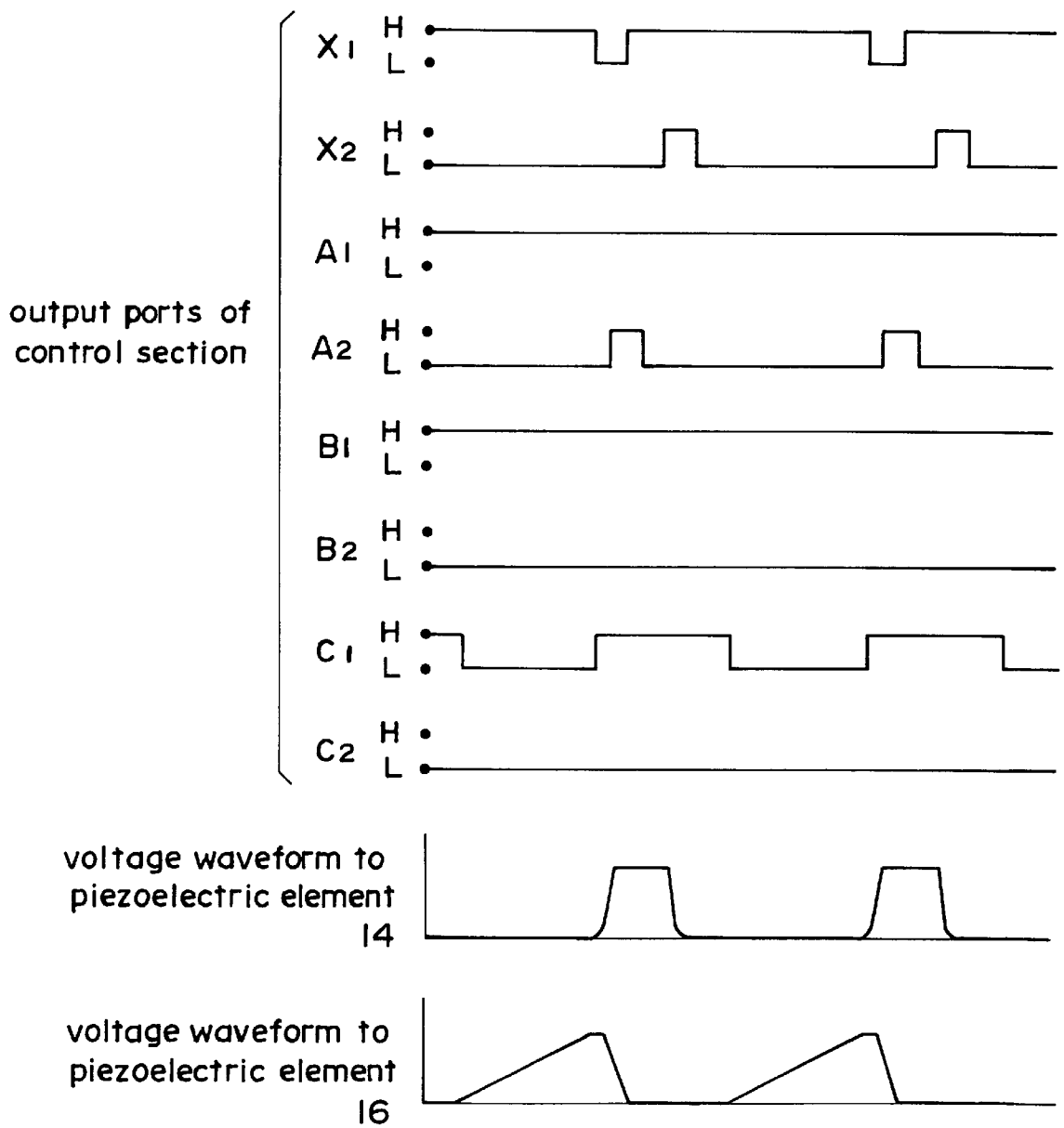
FIG. 8 is a chart for explaining output signals of a control section and the voltage waveforms applied to piezoelectric elements in the case of low-speed driving.

FIG. 8 is a chart for explaining voltage waveforms applied to the piezoelectric elements and signals output from the output ports of the control section 31 when driving the drive apparatus of the present invention at low speed. In the figure is shown an example for controlling the piezoelectric element 14 and the piezoelectric element 16 by the first-current charging and discharging circuit 35, the first-current charging and discharging circuit 36 and the third-current charging and discharging circuit 38 to drive them at low speed.

That is, the output port X1 of the control section 31 is maintained at H (high level), X2 is maintained at L (low level), the piezoelectric element 14 is maintained in its unoperated state, the output port B1 is maintained at H, B2 is maintained at L and the circuits 37a and 37b are put in their unoperated states. Further, the output port A1 is maintained at H, C2 is maintained at L, and the circuit 36a and the circuit 38b are cut off. In this state (see (a) of FIG. 4), first the output port C1 is set to L. The transistor of the circuit 38a becomes conductive to slowly charge the piezoelectric element 16, and the charging stops when a saturated state is provided. Therefore, the output port C1 is toggled to H. The piezoelectric element 16 is in its extended state (see (b) of FIG. 4).

In this state, the output port X1 is toggled to L to charge the piezoelectric element 14 by the circuit 35a, so that the driving axis 13 is fixed to the base member 11 (see (c) of FIG. 4). The output port A2 is toggled to H to make the FET of the circuit 36b conductive, so that the charges that have been charged in the piezoelectric element 16 are discharged. The piezoelectric element 16 contracts, whereas the driving axis 13 does not move (see (d) of FIG. 4). After a lapse of a specified time, the output port X2 is toggled to H to make the FET of the circuit 35b conductive, so that the charges that have been charged in the piezoelectric element 14 are discharged, thereby making the apparatus return to its initial state (see (e) of FIG. 4).

Figure 9:
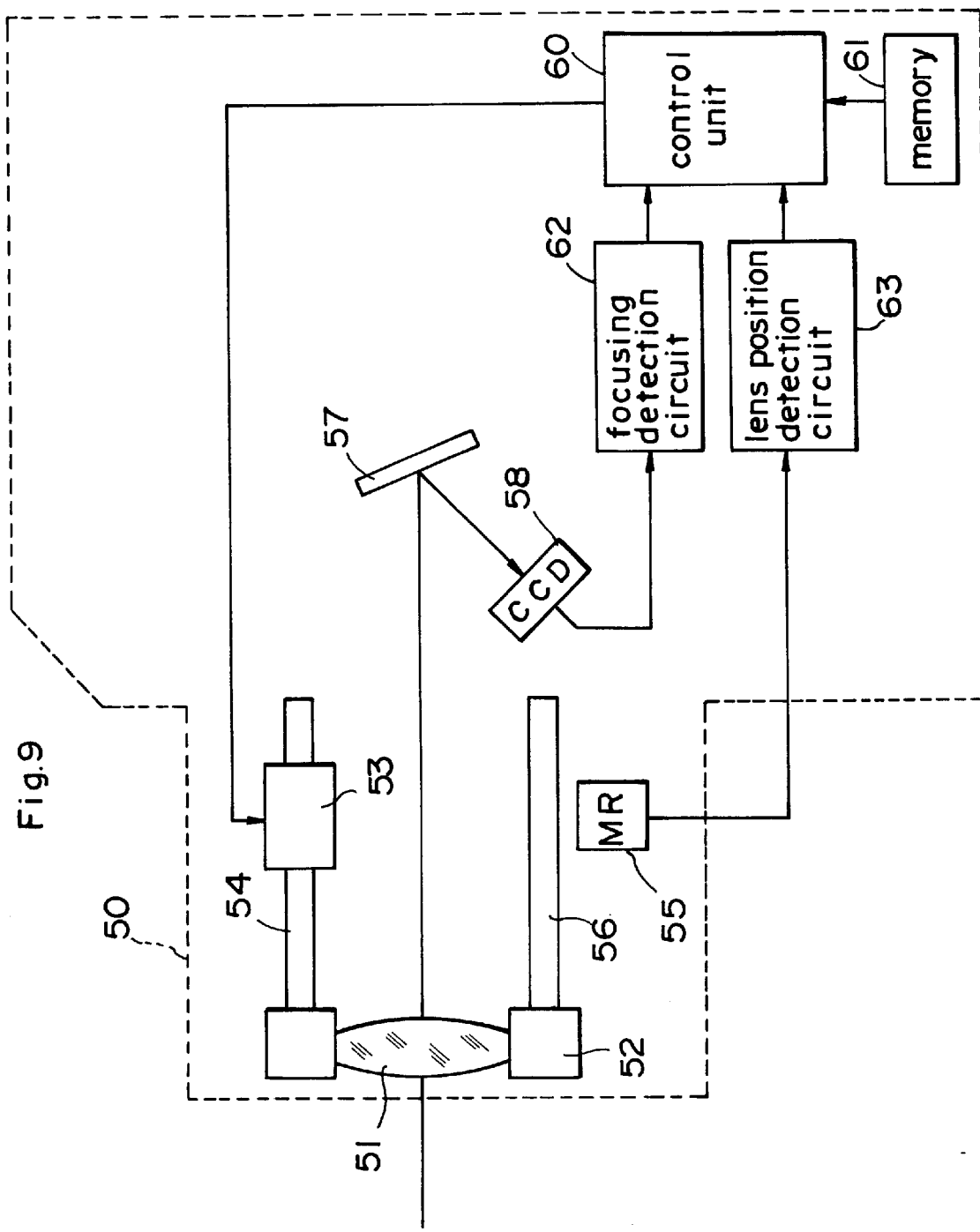
FIG. 9 is a block diagram of a control circuit for explaining the total structure of the above embodiment.

FIG. 9 is a block diagram of a control circuit for explaining the total structure of a camera of the present embodiment. The reference numbers 50, 51, 52, 53, 54, 55 and 56 denote a camera including a lens barrel, a lens, a lens holder frame, a drive apparatus, a driving axis for driving the lens holder frame, an MR sensor for detecting the position of the lens 51 in cooperation with a magnetized rod described later, and a guide axis which supports the lens holder frame and is magnetized with magnetic poles N and S at specified intervals to concurrently serve as a magnetized rod for the MR sensor 55, respectively. The magnetized rod is magnetized with magnetic poles N and S at a specified pitch (300 μm-pitch in this embodiment). The reference numbers 57 and 58 denote a reflection mirror and a focus detection element comprised of a CCD, respectively.

The reference number 60 denotes a control unit comprised of a CPU, while the reference number 61 denotes a drive constant memory which stores therein a number of drive cycles corresponding to the amount of movement in the case of executing the low-speed driving. In the case of the low-speed driving, the amount of movement per one drive cycle is the amount of extension (1.5 μm in this embodiment) of the piezoelectric element. In practice, due to the variation of characteristics of the piezoelectric elements, the exact, specified amount of extension (1.5 μm in this embodiment) is not accurately achieved. Assuming that the error is 0.1 μm per one drive cycle, there is generated an error of 10 μm in 100 cycles of the driving. Therefore, the drive constant memory 61 is made to store therein a number of drive cycles corresponding to the amount of movement of 100 μm predetermined based on the characteristics of the piezoelectric element to be used, and it is used for calculating the number of drive cycles corresponding to the amount of movement when executing the low-speed driving.

The reference number 62 denotes a focusing detection circuit for detecting the in-focus state of the lens based on an output signal from the focus detection element 58, while the reference number 63 denotes a lens position detection circuit for detecting the lens position based on an output signal from the MR sensor 55.

Figure 10:
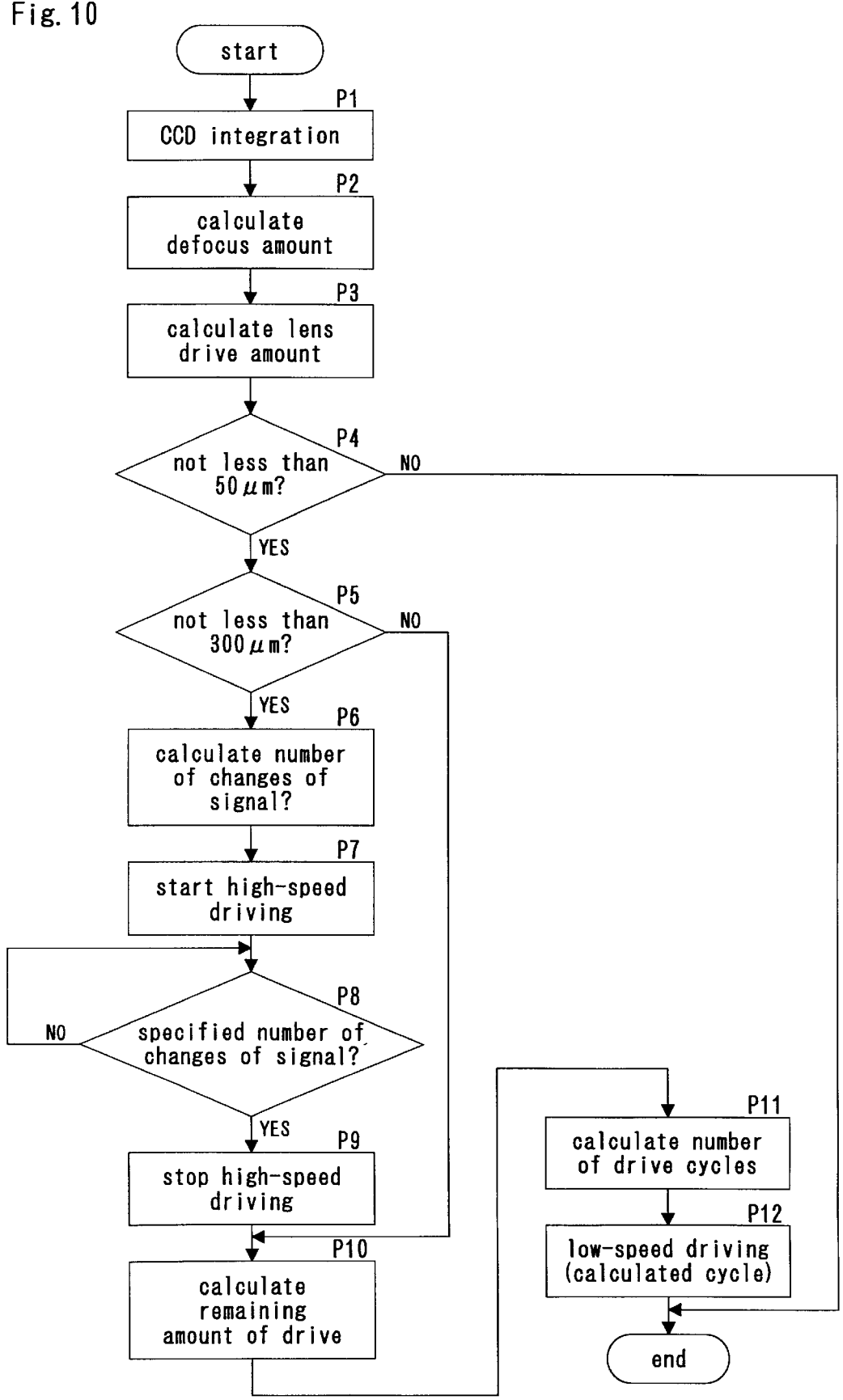
FIG. 10 is a flowchart for explaining the control operation of the control circuit shown in FIG. 9.

Next, the control operation of the lens drive apparatus executed by the control unit 60 will be described with reference to the flowchart of FIG. 10. First, in order to detect the in-focus state of the lens, the output of the focus detection element 58 is integrated to calculate a defocus amount (including the information whether the defocus is front focus or rear focus) (steps P1 and P2), and a lens drive amount is calculated based on the calculated defocus amount (step P3).

It is determined whether or not the lens drive amount is not smaller than 50 $\mu$m (step P4). When it is smaller than 50 $\mu$m, it is determined that an in-focus state is achieved and the processing ends. When it is not smaller than 50 $\mu$m, it is determined whether or not the lens drive amount is smaller than 300 $\mu$m (step P5). When it is not smaller than 300 $\mu$m, the number of changes of a signal that is output from the MR sensor 55 when driving the lens to the in-focus position is preparatorily calculated (step P6). The number of changes of the signal depends on the magnetization pitch (300-$\mu$m pitch in this embodiment) of the magnetized rod (guide axis) 56. Therefore, when the drive amount is within a range of 300 to 599 $\mu$m, the number of changes of the signal is one in this embodiment. When the drive amount is within a range of 600 to 899 $\mu$m, the number of changes of the signal is two in this embodiment.

The high-speed driving is started (step P7), waiting is effected for the attainment of a specified number of changes of the signal corresponding to the drive amount from the MR sensor 55 (step P8), and the high-speed driving is stopped when the specified number of changes of the signal is attained (step P9).

The remaining amount of drive is calculated (step P10). For example, assuming that the initial drive amount is 800 $\mu$m, a movement of 600 $\mu$m has been achieved since the high-speed driving is stopped when the number of changes of the signal is two, and the remaining amount of drive is 200 $\mu$m.

The number of drive cycles of the low-speed driving is calculated from the remaining amount of drive (step P11), and the piezoelectric element is driven at low speed by the calculated number of cycles (step P12). In the case of the low-speed driving, the amount of movement per one drive cycle depends on the amount of extension (1.5 $\mu$m in this embodiment) of the piezoelectric element, and therefore, the number of drive cycles can be easily calculated from the amount of drive. It is to be noted that more correct driving can be achieved if the amount of extension of the piezoelectric element is corrected according to the variation of the characteristics of piezoelectric elements.

When the lens drive amount is smaller than 300 $\mu$m in the determination process of step P5, the operation proceeds to step P11 in order to immediately execute the low-speed driving.

It is to be noted that, when the high-speed driving is stopped, slip is generated between the drive apparatus 53 and the driving axis 54 for driving the lens holder frame 52, and the lens holder frame 52 sometimes stops after slightly passing through the specified position. In such a case, it is acceptable to actually measure the amount of slip and subtract the average value of it, e.g., 10 $\mu$m from the remaining amount of drive. Indeed, when the average value of the amount of slip is smaller than the minimum unit of the detected defocus amount, it can be ignored.

As described above in detail, this embodiment is provided with the first electro-mechanical transducer arranged between the base member and the holder for holding the moving member and the second electro-mechanical transducer that is displaced so that it takes the first state in which the moving member is substantially fixed to the base member and the second state in which the moving member is substantially released with respect to the base member.

Then, in the first control mode for executing the high-speed driving, the second electro-mechanical transducer is maintained in the second state, extension/contraction displacement is generated at a varied speed in the first electro-mechanical transducer, and the moving member that is put in frictional coupling with the holder is driven. In the second control mode for executing the low-speed driving, the driving operation of the moving member by the first electro-mechanical transducer is combined with the operation of maintaining the second electro-mechanical transducer in the first state and the second state, thereby driving the moving member put in frictional coupling with the holder.

According to the distance of movement of the objective member to be moved, it is allowed to execute the driving by combining the first control mode with the second control mode. Therefore, high-speed high-accuracy position control can be easily achieved at low cost.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus comprising:
   a base member;
   a moving member which is movable relative to said base member;
   a holder which holds said moving member by frictional coupling with a first frictional force;
   a first electro-mechanical transducer which is provided between said base member and said holder and operates to extend and contract a gap between said base member and said holder in a direction in which said moving member moves;
   a second electro-mechanical transducer which is displaceable, said second electro-mechanical transducer having a first state in which said moving member is substantially fixed with respect to said base member and a second state in which said moving member is substantially released with respect to said base member; and
   a controller which selectively effects one of:
      a first control mode in which said second electro-mechanical transducer is maintained in said second state, said holder is made to reciprocate at a varied speed depending on when it extends or returns by generating extension/contraction displacement in the first electro-mechanical transducer at a varied speed depending on when the transducer is extended or contracted, thereby driving said moving member put in frictional coupling with said holder in a specified direction with respect to said base member; and
      a second control mode in which an operation of reciprocally displacing said holder with respect to said base member by generating extension/contraction displacement in said first electro-mechanical transducer is combined with an operation of switching the state of said second electro-mechanical transducer between said first state and said second state, thereby driving said moving member put in frictional coupling with said holder in a specified direction with respect to said base member.

2. An apparatus as claimed in claim 1 further comprising a detector which detects a position of said moving member so that said controller selects one of said control modes in response to a detection result of said detector.

3. An apparatus as claimed in claim 2, wherein said controller finds a required amount of movement of said moving member from the detection result, and selects one of said control modes in compliance with the found amount.

4. An apparatus as claimed in claim 3, wherein said first control mode is selected when the found amount is larger than a predetermined amount, and otherwise said second control mode is selected.

5. An apparatus as claimed in claim 1, wherein said apparatus is a camera, and said camera includes a lens unit which is connected to said moving member.

6. An apparatus as claimed in claim 5 further comprising a focus detector which detects a focusing condition of said lens unit with respect to a predetermined focusing plane, and said controller selects one of said control modes in response to the detected focusing condition.

7. An apparatus as claimed in claim 6, wherein said first control mode is selected when the detected focusing condition shows that a defocusing amount is relatively large, and said second control mode is selected when the defocusing amount is relatively small.

8. An apparatus comprising:

a base member;

a moving member which is movable relative to said base member;

a holder for maintaining said moving member in a frictional coupling with a first frictional force;

a first electro-mechanical transducer which is provided between said base member and said holder and operates to extend and contract a gap between said base member and said holder at a varied speed depending when it is extended or contracted in a direction in which said moving member moves, thereby driving said moving member put in frictional coupling with said holder in a specified direction with respect to said base member; and a second electro-mechanical transducer which is displaceable, said second electro-mechanical transducer having a first state in which said moving member is substantially fixed with respect to said base member and a second state in which said moving member is substantially released with respect to said base member.

9. An apparatus according to claim 8 further comprising:

a controller which selectively effects one of:

a first control mode in which said moving member is moved by sole extension/contraction operation of said first electro-mechanical transducer; and a second control mode in which said moving member is moved by a combination of said extension/contraction operation of said first electro-mechanical transducer and an operation of switching the state of said second electro-mechanical transducer between said first state and said second state.

10. An apparatus as claimed in claim 9 further comprising a detector which detects a position of said moving member so that said controller selects one of said control modes in response to a detection result of said detector.

11. An apparatus as claimed in claim 10, wherein said controller finds a required amount of movement of said moving member from the detection result, and selects one of said control modes in compliance with the found amount.

12. An apparatus as claimed in claim 11, wherein said first control mode is selected when the found amount is larger than a predetermined amount, and otherwise said second control mode is selected.

13. An apparatus as claimed in claim 9, wherein said apparatus is a camera, and said camera includes a lens unit which is connected to said moving member.

14. An apparatus as claimed in claim 13 further comprising a focus detector which detects a focusing condition of said lens unit with respect to a predetermined focusing plane, and said controller selects one of said control modes in response to the detected focusing condition.

15. An apparatus as claimed in claim 14, wherein said first control mode is selected when the detected focusing condition shows that a defocusing amount is relatively large, and said second control mode is selected when the defocusing amount is relatively small.

\* \* \* \* \*